L. B. LAWRENCE.
Vehicle-Wheel.
No. 216,279. Patented June 10, 1879.
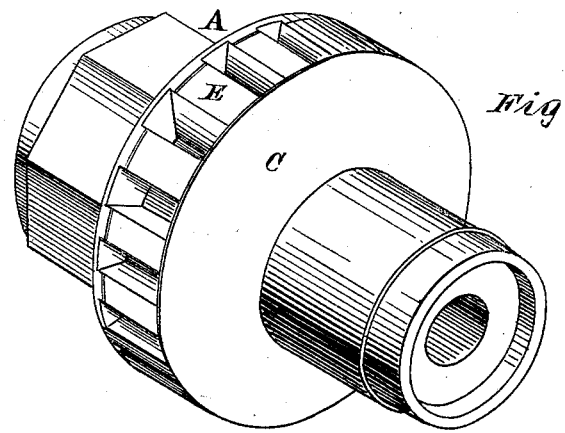
Fig. 1.
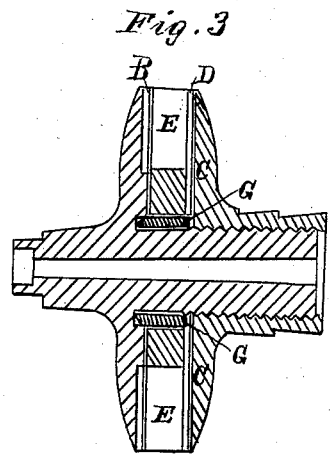
Fig. 3.
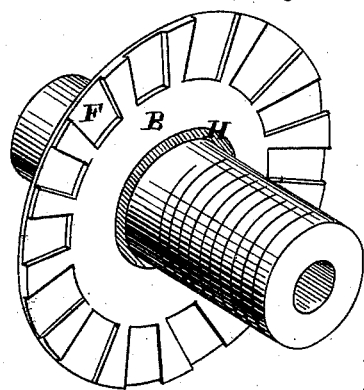
Fig. 2.
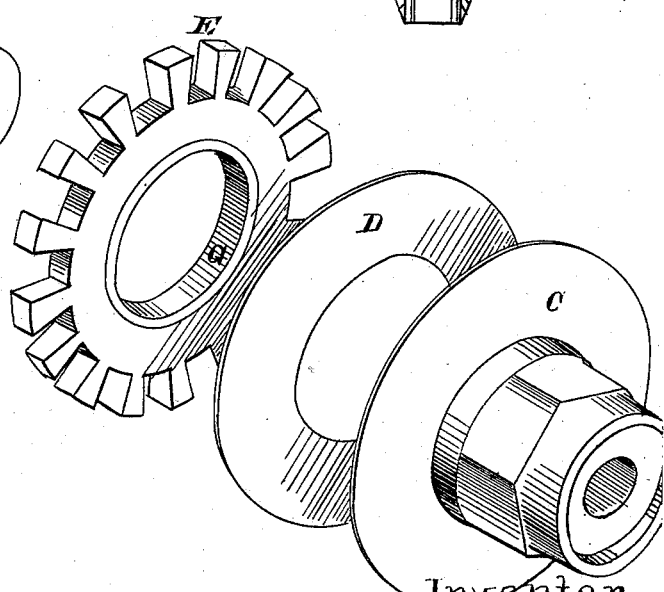
Witnesses
Geo. H. Strong
Frank A. Brooks
Inventor
Lorenzo B. Lawrence
Dewey & Co
Attys

UNITED STATES PATENT OFFICE.

LORENZO B. LAWRENCE, OF MONTICELLO, CALIFORNIA.

IMPROVEMENT IN VEHICLE-WHEELS.

Specification forming part of Letters Patent No. 216,279, dated June 10, 1879; application filed November 9, 1878.

*To all whom it may concern:*

Be it known that I, LORENZO B. LAWRENCE, of Monticello, county of Napa, and State of California, have invented an Improved Construction for Wheels; and I hereby declare the following to be a full, clear, and exact description thereof, reference being had to the accompanying drawings.

My invention relates to certain improvements in the construction of wheels; and it consists more especially in a novel construction of the hub of the wheel, and in the employment of a compressed-rubber or other elastic holder or socket for the spokes, in combination with a stationary and a movable flange, one being secured to or forming a part of the hub or axle-box, while the other moves upon a screw-thread upon the inner end of the said box, and may be set up against the elastic spoke-socket disk, so that the spokes will be firmly held in place.

My invention further consists in the employment of an expanding-ring which is fitted to the exterior of the hub or axle-box, so that it may be forced beneath or within the elastic spoke-holder, and when the flanges are screwed up this expander will force the spokes outward, so as to tighten the tire when loose. In wet weather, or when the tire is reset, the expander can be removed and the wheel will be prevented from becoming dished by the contraction. Slight depressions in each of the flanges receive the sides of the spoke-tenons, which may also be protected by thin elastic side washers. The expanding-ring may also be steadied by extending it beneath the stationary flange.

In order to more fully explain my invention reference is made to the accompanying drawings, in which Figure 1 is an exterior view of my wheel-hub. Fig. 2 is a view with the spoke-tenon socket with the outer disk removed. Fig. 3 is a transverse section.

The axle-box may be shrunk inside of the hub, or the hub made small, as shown in the present instance, the flange hereinafter described furnishing side bearings for the spokes.

In the drawings, A represents the hub of the wheel, and B the stationary flange, which is secured to or forms part of the hub. On the inner end of the hub or axle-box are formed screw-threads, onto which screws the collar C, carrying the movable flange D.

The holder or socket-piece for the spokes is formed of rubber firmly compressed by hydraulic or other power, or of other suitable elastic substance. This holder or socket-piece E is fitted to slide over the hub or axle-box and be held in place between the two flanges B D. Its outer rim is formed with alternate depressions and projections, as shown, so as to form sockets for the spokes.

Recesses or depressions F are formed in the inner faces of the flanges B D to receive the sides of the spoke-tenons. These recesses or depressions come opposite the sockets formed in the elastic socket-piece E when it is in position. The sides of these recesses or depressions F may be protected by thin elastic side washers if desired, so that the spokes will have elastic bearings on all sides.

An expanding-ring, G, having a beveled edge, as shown, is fitted to the exterior of the hub or axle-box, between the two flanges, by means of which the elastic holder or socket-piece is expanded vertically or outwardly, so that the spokes in said elastic spoke-holder will be forced outwardly from the center and tighten the tire when loose. This is accomplished by screwing up tightly the collar and movable flange, which forces the expanding-ring under the elastic spoke-holder. An annular depression or groove, H, is cut in the stationary flange close to the hub or axle, into which the beveled edge of the expanding-ring may pass as the movable flange is screwed up, thus steadying the expanding-ring and admitting of greater expansion of the elastic socket-piece. A small set-screw will hold the flange from turning when in position.

From this construction it will be seen that the spokes have an elastic bearing in the hub, their ends resting on the rubber socket-piece, and their shoulders bearing on it as well. In dry weather the expanding-ring may be put in place on the axle-box and the movable flange screwed up against it, so as to press its beveled edge under or within the elastic spoke-holder, thus forcing the spokes out against the felly, so as to tighten the tire. When the weather becomes wet the expanding-ring may be removed, so that the wheel may be prevented from becoming dished by the contraction.

When the movable flange is screwed up against the elastic spoke-holder, said spoke-holder is compressed between the flanges in such a manner as to hold the spoke firmly in place, while at the same time they are in a bearing with sufficient elasticity to make the movement of the vehicle easy and reduce the jar commonly felt. This jar may be still further reduced by the use of elastic bushings to the box.

Having thus described my invention, what I claim as new, and desire to secure by Letters Patent, is—

1. The improvement in the construction of wheel-hubs, consisting of the elastic spoke-tenon socket E, in combination with the flanges B D, fitted to be screwed or otherwise compressed against the elastic socket, substantially as and for the purpose herein described.

2. The flange B cast on the hub, and provided with depressions F, and the screw-flange D, in combination with the elastic spoke-sockets E, the whole constructed and arranged substantially as described.

3. The elastic spoke-tenon sockets E, in combination with the expanding-ring G and the compressing and holding flanges B D of the wheel hub or box, substantially as and for the purpose herein described.

In witness whereof I have hereunto set my hand and seal.

LORENZO B. LAWRENCE. [L. S.]

Witnesses:
 N. L. LAWRENCE,
 T. B. FOWLER.